(12) United States Patent
Lerat et al.

(10) Patent No.: US 6,309,043 B1
(45) Date of Patent: Oct. 30, 2001

(54) DEVICE USING THE ACTION OF A GAS FOR CONTROLLING THE MOVEMENT OF A FLUID

(75) Inventors: Yannick J. Lerat, Chalon sur Saone; Didier J. Martin, Givry; Olivier J. Poncelet, Chalon sur Saone; Thierry Vachette, Esbarres, all of (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/414,173

(22) Filed: Oct. 7, 1999

(30) Foreign Application Priority Data

Oct. 9, 1998 (FR) .................................................. 98 12847

(51) Int. Cl.$^7$ ........................................................ B41J 2/04
(52) U.S. Cl. .............................................................. 347/21
(58) Field of Search ................................. 347/20, 21, 54, 347/55, 85; 60/37; 429/80; 251/129.01

(56) References Cited

U.S. PATENT DOCUMENTS

| | | | |
|---|---|---|---|
| 3,739,573 | 6/1973 | Giner | 60/37 |
| 5,227,257 | 7/1993 | Abraham et al. | 429/80 |
| 5,671,905 | 9/1997 | Hopkins, Jr. | 251/129.01 |

FOREIGN PATENT DOCUMENTS

| | | | |
|---|---|---|---|
| 0 204 872 | 12/1986 | (EP) . | |
| 0 820 868 A2 | 1/1998 | (EP) . | |
| SHO-61-69467 | * 4/1986 | (JP) | 347/54 |
| 07276632 | 10/1995 | (JP) . | |
| 10175295 | 6/1998 | (JP) . | |
| WO 96/32284 | 10/1996 | (WO) . | |

OTHER PUBLICATIONS

Hue, P Le "Progress and Trends in Ink–jet Printing Technology", Journal of Imaging Science and Technology, vol. 42, No. 1 Jan./Feb. 1998, pp. 49–62.

* cited by examiner

Primary Examiner—Anh T. N. Vo
(74) Attorney, Agent, or Firm—Milton S. Sales

(57) ABSTRACT

The invention relates to a device for moving fluids. The invention device includes an enclosure, a solid electrolyte which can produce oxygen in the enclosure so as to distort a membrane that acts to move a fluid in an enclosure. This device is useful to produce a head for ink jet printing.

10 Claims, 3 Drawing Sheets

DEVICE USING THE ACTION OF A GAS FOR CONTROLLING THE MOVEMENT OF A FLUID

FIELD OF THE INVENTION

The present invention relates to a device for controlling the movement of a fluid, and to the use of this device in ink jet printing technology.

BACKGROUND OF THE INVENTION

In ink jet printing technology, the main issues are to improve the quality and speed of printing.

Almost all the printing technologies developed today have the objective of producing high quality copies as fast as possible. In the case of ink jet technologies, one way to achieve fast printing is to multiply the number of nozzles that can eject ink drops on the head surface to print a larger number of points in parallel on the receiving support. However, the number of nozzles on the head surface is limited either because of problems related to heat dissipation in methods involving heating the ink to a high temperature, or because of problems related to dimensional instability due to the vibrations in methods using piezoelectric technologies.

One of the conventional technologies for producing ink jet heads comprises heating the ink found in a channel to a temperature, of usually from 300 to 400° C., in a very short time such as a few microseconds. This leads to local vaporization of the ink that causes the expulsion as drops of the liquid part of the ink found between the vaporization zone and the surface of the ink jet head. This method requires thermal energy in the volume of the ink jet head itself, and this thermal energy must then be dissipated.

Other techniques, such as described European Patent Application 771,272, comprises the step of bringing the fluid into contact with a ring-shaped heating element located at the opening periphery of the channel linking a reservoir containing the fluid to the opening at the surface of the ink jet head. Pressure is applied to the reservoir in order to allow the ink to be carried through the channel and spread out onto the ring-shaped heating surface of the ink jet head. When the heating element of the ink jet head is raised to a temperature of about 130° C., there follows a significant alteration of the surface tension of the ink drop found in contact with the heating element. This alteration of the surface tension causes a decrease in the radius of curvature of the ink drop meniscus thus enabling it to run freely through the channel and to form a drop of the size suitable for the printing required. Once formed, this drop is then ejected by a means such as an electrostatic field between the ink jet head and the print media, for instance a sheet of paper. This technique, which has the advantage of considerably lowering the temperature required to eject a unit volume of ink, is thus more suitable for manufacturing highly integrated ink jet heads. In theory, it is only necessary to heat the surface of the ink drop meniscus to obtain the alteration of its radius of curvature and thus its ejection; but in practice, it is necessary to heat the whole volume of the ink drop, and therefore a much higher energy is required to eject an ink drop. On the other hand, as the whole volume of the ink drop is heated, part of the energy supplied to the ink drop is still contained in it on ejection, and this facilitates the dissipation of this energy which thus does not remain confined in the ink jet head.

SUMMARY OF THE INVENTION

It is an object of the invention to provide a device to control the movement of a fluid, for example an ink, which minimizes the amount of energy used to eject a drop of this fluid and allows a precisely set volume of fluid to be ejected.

The device for controlling fluid movement according to the present invention comprises a fluid conduit through which fluid can flow; a solid electrolyte having the properties of conducting $O_2-$ ions when subjected to an electric current and to heat, said electrolyte being disposed relative to the fluid conduit so as to control fluid flow through the conduit; and an electrode adapted to selectively apply electrical field to the electrolyte.

The invention further relates to a process for controlling the movement of a fluid, this process using a solid electrolyte whose $O_2-$ ion conducting properties can be selected under the action of electric current and at a temperature such that oxygen from the air can be conducted by the solid electrolyte, and this oxygen being used as a means to control fluid movement.

The process comprises the steps of:

(i) heating and energizing a solid electrolyte that is a conductor of $O_2-$ ions to create an electric field in the solid electrolyte which extracts oxygen from the air in an enclosure and the oxygen acting to control the fluid movement;

(ii) reversing polarity of the solid electrolyte to effect suppression of oxygen pressure in the enclosure, and;

(iii) the repetition of the cycle of operations (i) and (ii).

The operations (i) and (ii) of the above process can be repeted at least several hundreds of time per second.

The invention further relates to a printing fluid jet head comprising:

a) at least one means for feeding printing fluid;

b) at least one channel ending with a nozzle open to the outside;

characterized in that it further comprises:

c) a means for moving printing fluid comprising a solid electrolyte whose $O_2-$ ion conducting properties can be selected under the action of electric current and temperature.

DETAILED DESCRIPTION OF THE INVENTION

The solid electrolyte used according to the invention is described in the U.S. Pat. No. 5,227,257. This electrolyte is a substance derived from $Bi_4V_2O_{11}$ comprising a gamma phase structure, and whose Bi and/or V elements have been replaced by substitution elements to permit $O_2$- ion conductivity without altering the gamma phase. The formula for the solid electrolyte is:

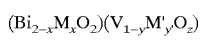

where,

M represents one or more Bi substitution metals, having an oxidation level less than or equal to 3.

M' represents one or more V substitution elements, selected from the class constituted by the alkaline metals, alkaline-earth metals, transition metals, metals in groups IIIa to Va, metals in groups IIIb to Vb, and the rare earths;

The limit values of x, y, x being a function of the nature of the M and M'; and x plus y is greater than zero.

These solid electrolytes used according to the invention can be connected to a current source and heated to a temperature of less than 500° C. and preferably between 150 and 300° C., the temperature at which they become conductors. When the solid electrolyte becomes a conductor, and a potential difference is applied to it, each face of the cell behaves like an electrode. Molecular oxygen dissociates at the surface of the cathode by forming $O_2$— ions that cross the solid electrolyte and recombine as molecular oxygen on arriving on the other face which behaves as an anode. As a result, the solid electrolyte extracts oxygen from the air in an enclosure or chamber and the oxygen extracted is acting to control the fluid movement. Once the polarity is reversed, the migration of $O_2$— ions is reversed. This reversal is almost instantaneous, so that by alternating the polarity successively, the migration of the $O_2$- ions can be reversed several hundreds or thousands of times a second.

These solid electrolytes are described in the U.S. Pat. No. 5,227,257 and are referred to in the literature under the generic name Bimevox, or according to the metal combined with the Bismuth, under the names Bicuvox, Bicovox, Biznvox, etc.

Figure 1:
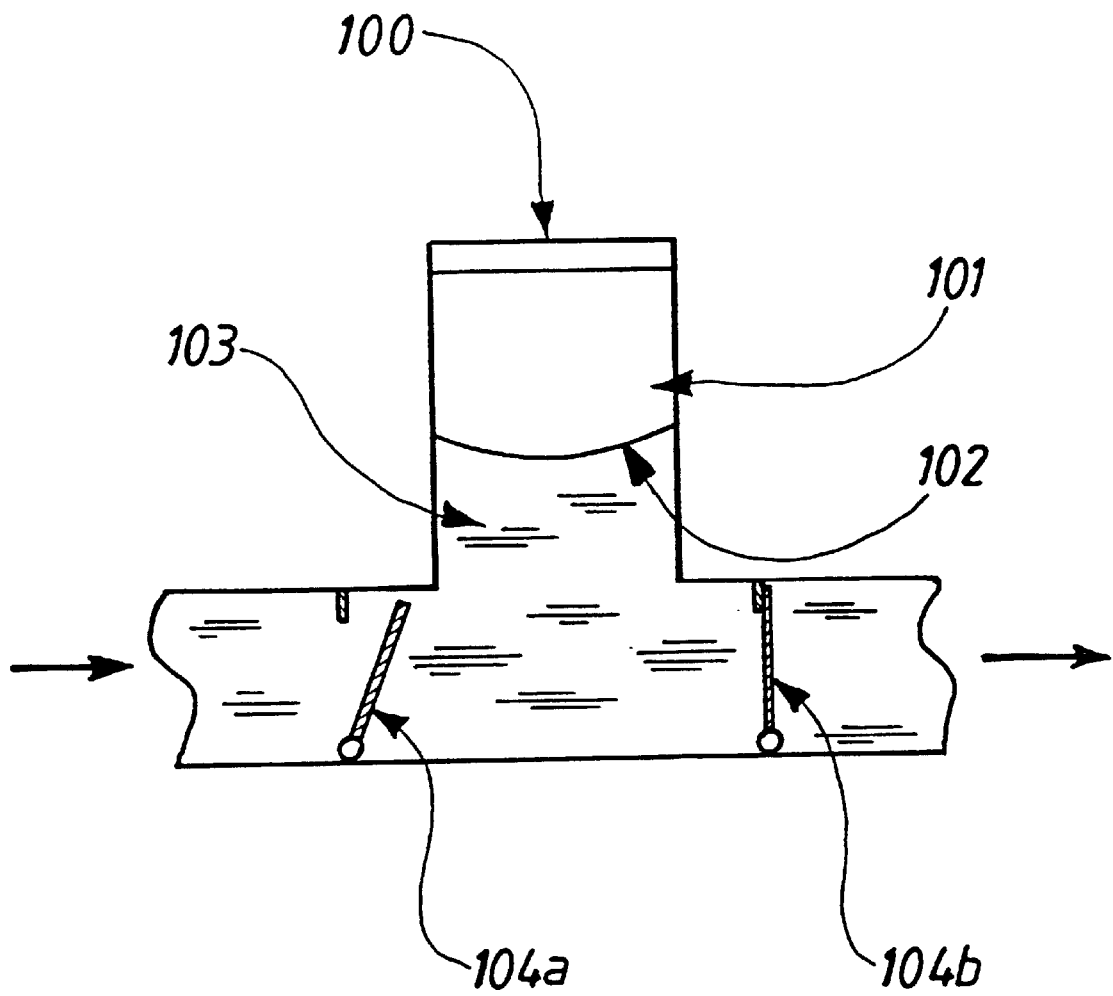
FIG. 1 represents diagrammatically a part of a printing fluid jet head, provided with the means to control the fluid movement according to the invention.

FIG. 1 represents an embodiment of a device for controlling the movement of a fluid according to the present invention. In this embodiment, a volume of oxygen is produced by a cartridge (100) comprising a solid electrolyte such as a Bimevox element (not represented). This volume of oxygen is introduced in chamber (101). Then, the gas pressure thus produced in a first chamber (101) is used to distort a membrane (102), which itself by its distortion causes a movement of the fluid contained in a second chamber (103) that is contiguous with (101). A system of inlet and outlet check valves (104a) and (104b) completes the device by allowing the movement of a preset amount of fluid as a function of the rhythm of the membrane's pulses, which are themselves controlled by oxygen extracted by the element (100).

Figure 2:
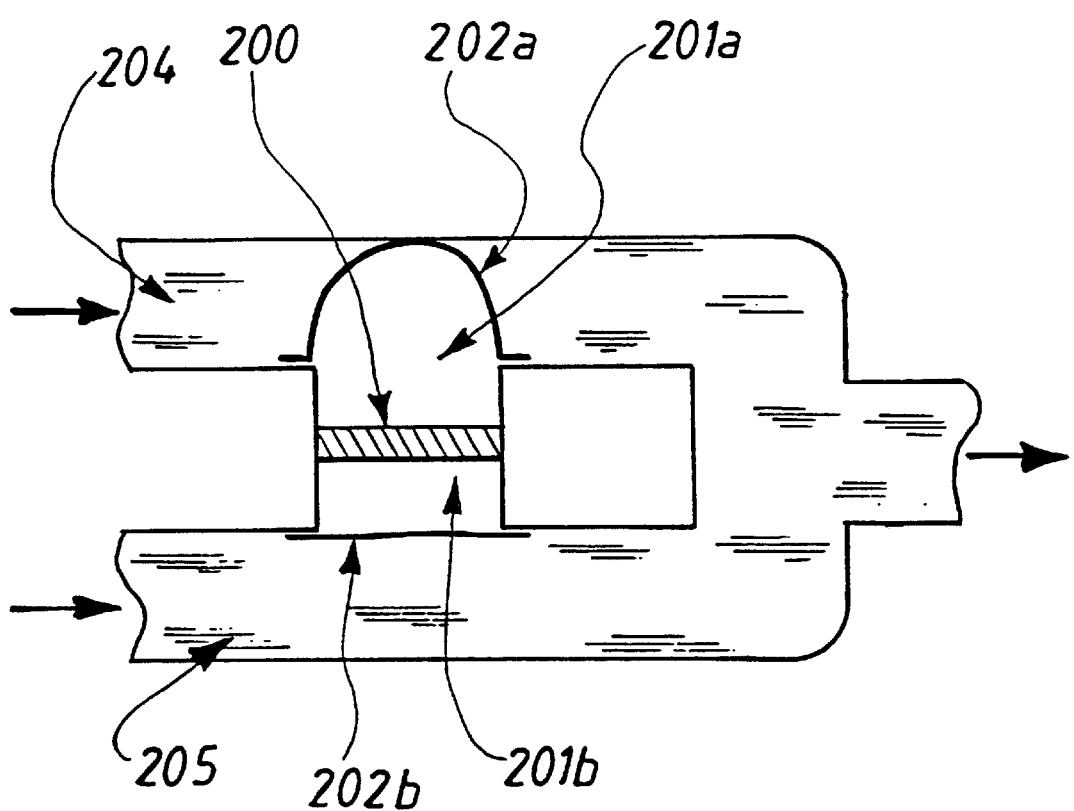
FIG. 2 represents diagrammatically an embodiment of a device comprising the means to control fluid movement according to the invention.

FIG. 2 represents another embodiment of a device for controlling the movement of a fluid, comprising a mixer with an input for a first fluid (204), and an input for a second fluid (205). The mixer chamber comprises a Bimevox cartridge (200) provided on each face with a flexible membrane (202a) and (202b), capable of defining the oxygen volumes (201a) and (201b), respectively. The device is shown in the configuration where the element (200) has formed an oxygen bubble in chamber (201a) defined by the membrane (202a). Because of this, the oxygen bubble blocks the access (204). In the next configuration (not shown), the polarity of the element (200) is reversed so that an oxygen bubble is released in chamber (201b) defined by the flexible membrane (202b), blocking the fluid access (205), whereas the access (204) is cleared.

Figure 3:
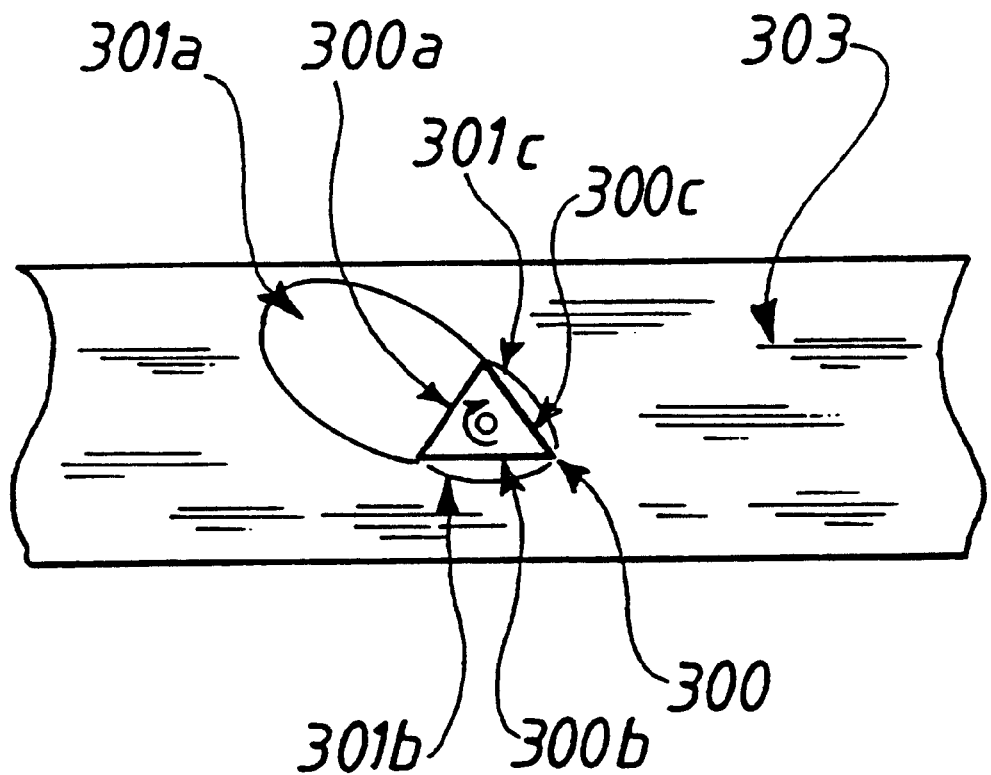
FIG. 3 represents another embodiment of a device to control fluid movement according to the invention.

FIG. 3 represents still another embodiment of a device to control the movement of a fluid according to the invention, which is a micropump activated by oxygen bubbles produced by an element (300) having three Bimevox cartridges (300a), (300b) and (300c). Each cartridge is combined with a flexible membrane (301a), (301b) and (301c), capable of containing an oxygen bubble produced by the associated Bimevox cartridge. For example, starting from what is represented in FIG. 3 an oxygen bubble is generated in the chamber defined by the membrane (301a). Then, the next step consists in activating the cartridge (300b) at the same time as the polarity of the cartridge (300a) is reversed. Thus, the bubble initially formed in (301a) disappears at the same time as a new oxygen bubble forms in the chamber defined by the membrane (301b). The continuation of this operational cycle causes the fluid to circulate in the chamber (303). Such a device works like a fluid delivery micropump which can for instance find applications in the medical field.

A Bimevox-containing cartridge such as (100) in FIG. 1 or the corresponding elements in the FIGS. 2 or 3, usually has a solid electrolyte pellet in contact with electrodes that are themselves linked to a source of electric current. The solid electrolyte/electrode assembly must be combined with a heating means that enables the Bimevox to be operated at the required temperature. This temperature is between 150 and 500° C. This operating temperature allows the heat produced to be dissipated by the usual techniques, particularly as the Bimevox heating means is isolated from the fluid to be moved by the chamber where the gas is produced.

According to one embodiment, a compacted Bimevox pellet is made, in which are inserted two metal grids flush with each surface of the pellet and acting as electrodes. According to a preferred embodiment these grids are made with a noble metal such as gold. This can be done by chemical vapor deposit (using a plasma). Such a solid electrolyte can function below 500° C., at a voltage of 1 to 30 V, advantageously 1 to 15 V, and with a current density of 100 to 1500 mA/cm$^2$, for example with 200 mA/cm$^2$, with very fast polarity reversal cycles, as mentioned above.

The presence of the membrane allows the oxygen extracted by the solid electrolyte to be prevented from being in contact with the fluid to be moved, in so far as the latter is sensitive to oxygen. To the extent that this fluid is resistant to oxidation, the presence of the membrane can become optional, as the gas bubbles allow the fluid movement to be controlled.

The fluids are especially the inks used in ink jet printing devices. These inks are compositions comprising water, solvents, water soluble dyes, surfactants, antiseptics, antifoam agents, bactericides or fungicides etc. Their viscosity, which is variable, can be between 2 cp and 8 cp for water-based inks, and can be adjusted, according to the constituents, with thickening agents. Typical compositions are for instance described in Progress and Trends in Ink-jet Printing Technology by Hue P. Le, Journal of Imaging Science and Technology 42; pages 49–62 (1998).

What is claimed is:

1. A device for controlling fluid movement; said device comprising a fluid conduit through which fluid can flow;

a solid electrolyte which is adapted to extract oxygen from air in an enclosure when subjected to an electrical current and heat by dissociating oxygen of air, forming and conducting $O^{2-}$ ions that recombine as oxygen on arriving in the enclosure, said electrolyte being disposed relative to the fluid conduit so that oxygen arrived in the enclosure is acting to control fluid flow through the conduit; and an electrode adapted to selectively apply an electrical field to the electrolyte.

2. The device of claim 1, further comprising:

a component that contains the solid electrolyte;

a first chamber contiguous with the component and adapted to collect oxygen conducted by the solid electrolyte when the electric field is applied;

a second chamber containing the fluid to be moved; and a membrane defining a wall common to the first and second chambers, and means to allow admission and ejection of the fluid to and from the second chamber.

3. The device of claim 1, further comprising two membranes and two fluids, wherein the electric field applied to the solid electrolyte can be alternated, so that pressure of oxygen conducted by the solid electrolyte is used to alternately (i) distort said two membranes and (ii) clear access of said two fluids, in order to mix these two fluids with aim of moving the said mixed fluids.

4. The device of claim 1, wherein the solid electrolyte comprises a derivative of $Bi_4V_2O_{11}$ in gamma phase where at least one of the elements Bi or V is replaced at least in part by substitution elements, so that the gamma phase structure of $Bi_4V_2O_{11}$ is maintained as well as a balance of charges.

5. The device of claim 4, wherein the solid electrolyte comprises a compound with a formula:

$$(Bi_{2-x}M_xO_2)(V_{1-y}M'_yO_2)$$

where,

M represents one or more Bi substitution metals, having an oxidation number less than or equal to 3, M' represents one or more V substitution elements, selected from the class constituted by alkaline metals, alkaline-earth metals, transition metals, metals of groups IIIa to Va, elements of groups IIIb to Vb, and rare earths; a limit values of x, y, x being a function of the nature of M and M'; and x plus y is greater than zero.

6. A printing fluid jet head, comprising:

a device adapted to feed printing fluid;

at least one channel ending with a nozzle; and at least one device as set forth in claim 1 to control printing fluid movement.

7. A process to control fluid movement comprising:

(i) heating and energizing of a solid electrolyte that is a conductor of $O_2$-ions, to create an electric field in the solid electrolyte which extracts oxygen from air in an enclosure, and the oxygen acting to control the fluid movement;

(ii) reversing polarity of the solid electrolyte to effect suppression of oxygen pressure in the enclosure; and (iii) the repetition of the cycle of operations (i) and (ii).

8. The process of claim 7, wherein operations (i) and (ii) are repeated at least several hundreds of times a second.

9. The process of claim 7, wherein the solid electrolyte is heated to a temperature between 150 and 500° C. for the operations (i) and (ii).

10. The process of claim 7, wherein the electrolyte is under a voltage of between 1 and 30 V and a current density of between 100 and 1500 mA/cm².

* * * * *